United States Patent
Newman et al.

(10) Patent No.: US 7,102,568 B1
(45) Date of Patent: Sep. 5, 2006

(54) METHOD AND APPARATUS FOR SELECTING A MARINE RADIO OPERATING MODE

(75) Inventors: Kent David Newman, Hurst, TX (US); Todd William Crocker, Flower Mound, TX (US)

(73) Assignee: Uniden America Corporation, Ft. Worth, TX (US)

( * ) Notice: Subject to any disclaimer, the term of this patent is extended or adjusted under 35 U.S.C. 154(b) by 0 days.

(21) Appl. No.: 11/114,561

(22) Filed: Apr. 25, 2005

(51) Int. Cl.
*G01S 5/14* (2006.01)

(52) U.S. Cl. .......................... 342/357.17; 342/357.06; 342/357.13

(58) Field of Classification Search ............ 342/357.01, 342/357.06, 357.13, 357.17; 701/207, 213; 340/539.13, 539.2
See application file for complete search history.

(56) References Cited

U.S. PATENT DOCUMENTS

| | | | | |
|---|---|---|---|---|
| 5,841,862 A | * | 11/1998 | Obayashi et al. | .......... 455/424 |
| 6,057,880 A | * | 5/2000 | Schnee | ....................... 348/113 |
| 6,285,281 B1 | * | 9/2001 | Gatto | .................... 340/539.26 |
| 6,785,556 B1 | * | 8/2004 | Souissi | ....................... 455/557 |
| 2004/0029610 A1 | * | 2/2004 | Ihira et al. | .............. 455/550.1 |
| 2004/0204035 A1 | * | 10/2004 | Raghuram et al. | ....... 455/553.1 |
| 2006/0009254 A1 | * | 1/2006 | Kanazawa | .............. 455/553.1 |

* cited by examiner

*Primary Examiner*—Dao L. Phan
(74) *Attorney, Agent, or Firm*—Lawrence R. Youst; Kenneth T. Emanuelson; Danamraj & Youst, P.C.

(57) ABSTRACT

A marine vessel (102) is operable to set the operating mode of its marine radio (108) based upon the location of the marine vessel (102). The marine vessel (102) includes a first processor component (340) operable to determine the location of the marine vessel (102) based upon signal inputs (140, 142, 144). The marine radio (108) incorporates a database (310) containing a set of at least two operating modes and a second processor component (300) operable to select an operating mode from the set of at least two operating modes based on the location of the marine vessel (102).

20 Claims, 7 Drawing Sheets

METHOD AND APPARATUS FOR SELECTING A MARINE RADIO OPERATING MODE

TECHNICAL FIELD OF THE INVENTION

The present invention relates, in general, to marine radio operating modes and, in particular, to a method and apparatus for selecting an operating mode for a marine radio based on data received from a global positioning system.

BACKGROUND OF THE INVENTION

The United States Federal Government's NAVSTAR system, known generically as the global positioning system (GPS), provides worldwide positioning capability to its users with a system employing a set of fixed ground-based GPS controllers and a set of GPS satellites providing information suitable for use by passive GPS receivers. At any given time, there are at least 24 GPS satellites in operation, each orbiting Earth once every 12 hours at an altitude of 11,000 nautical miles. The position of each GPS satellite in the GPS system is calculated based on the relationship between that GPS satellite and one or more of the fixed ground-based GPS controllers.

Various components of the GPS system are operable to determine the distance between themselves, and therefore their respective positions, based on the time elapsed between the transmission of an electromagnetic signal by one GPS component and the receipt of the signal by another. Using this methodology, the GPS system has the capability to accurately determine the position of each GPS satellite with respect to the fixed ground-based GPS controllers, and therefore to the Earth itself.

Given that the electromagnetic GPS signals are traveling at the speed of light and that the distances involved are relatively short, the accuracy of the distance calculation depends on highly accurate timing synchronization, which is handled primarily with atomic clocks disposed within the various components of the system.

Each of the GPS satellites transmits signals to the other components of the GPS system. Civilian GPS satellite signals are transmitted at a frequency of 1575.42 MHz in the UHF band, while military GPS signals are transmitted at 1227.6 MHz. Signals at these frequencies can pass through clouds and fog, but will not pass through most solid objects such as buildings and mountains. Accordingly, a passive GPS receiver must have a clear line-of-sight to the GPS satellites necessary for positioning. A GPS satellite signal contains a pseudorandom satellite identification code, "ephemeris data" and "almanac data". Ephemeris data reflects satellite status and current date and time. Almanac data discloses the position of the GPS satellite and other GPS satellites in the system.

Within this framework of GPS satellites having known positions at known times, a passive GPS receiver can determine its position with respect to the Earth using the signal delay reckoning method described above. Signals from multiple satellites are required in order to calculate the position of the passive GPS receiver. Given the signal from only a single GPS satellite, a passive GPS receiver can determine only that it is at a point on a sphere of a known radius centered on a GPS satellite having a known position. Given the signal from two GPS satellites, a passive GPS receiver can determine that it is at a point on the intersection of two spheres having known radii and known central points. Based on the principles of geometry, the intersection of two such spheres is a circle lying on the plane of intersection of the two spheres. Given the signal from three GPS satellites, a passive GPS receiver can determine that it is at a point on the intersection of three spheres having known radii and known central points. The intersection of three spheres is a set of two discrete points. Accordingly, given three GPS satellite signals, a passive GPS receiver can limit the range of its possible locations to two discrete points in three-dimensional space. In practice, it is often the case that only one of these two points is near the surface of the Earth. Given four or more GPS satellite signals, the location of the passive GPS receiver can be limited to a single discrete point within a certain margin of error. As the number of GPS satellites is increased, the margin of error is, of course, reduced.

The utility of a GPS receiver to the user is much improved through the inclusion of map display capability within the GPS receiver. With this capability, the user of a GPS receiver is able to reference his or her present global position to nearby roads, geographic landmarks, and other points of interest included in the map data stored within, and displayed by, the GPS receiver.

SUMMARY OF THE INVENTION

The present invention relates to a method and apparatus for automatically selecting a marine radio communications mode for a marine vessel based upon the location of the vessel at a point in time. In certain embodiments, the location of the vessel is determined using global positioning signals received at the vessel. Based upon the received global positioning signals, the proper communications mode is automatically employed.

In one aspect, the present invention is directed to a marine vessel operable to set the operating mode of its marine radio based upon the location of the marine vessel. The marine vessel includes a first processor component operable to determine the location of the vessel based upon signal inputs. The marine radio incorporates a database containing a set of at least two operating modes and a second processor component operable to select an operating mode from the set of at least two operating modes based on the location of the marine vessel.

The operating mode may determine, for example, the set of frequencies over which the marine radio communicates or the local time setting for the marine radio. The operating mode may also determine whether the marine radio communicates using a simplex protocol or a duplex protocol for one or more channels. In certain embodiments, the signal inputs are global positioning signal inputs. In one embodiment, the first processor component may be a portion of a global positioning system receiver and the second processor component may be a portion of a fixed mount marine radio. In another embodiment, the first and second processor components may be components of a single processor located in the fixed mount marine radio.

In another aspect, the present invention relates to an apparatus for setting the operating mode for a marine radio onboard a marine vessel operating at a location. The apparatus includes a processor operable to determine the location of the marine vessel as well as a means for selecting an operating mode from a set of at least two operating modes based on operating mode selection criteria. The operating mode selection criteria may include the location of the marine vessel. The apparatus also includes a means for setting the operating mode of the marine radio to the selected operating mode.

In a further aspect, the present invention relates to a method of selecting an operating mode for a marine radio having a location. The method includes the the steps of determining the location of the marine radio, selecting an operating mode from a set of at least two operating modes based on operating mode selection criteria comprising the location of the marine radio and setting the operating mode of the marine radio to the selected operating mode.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
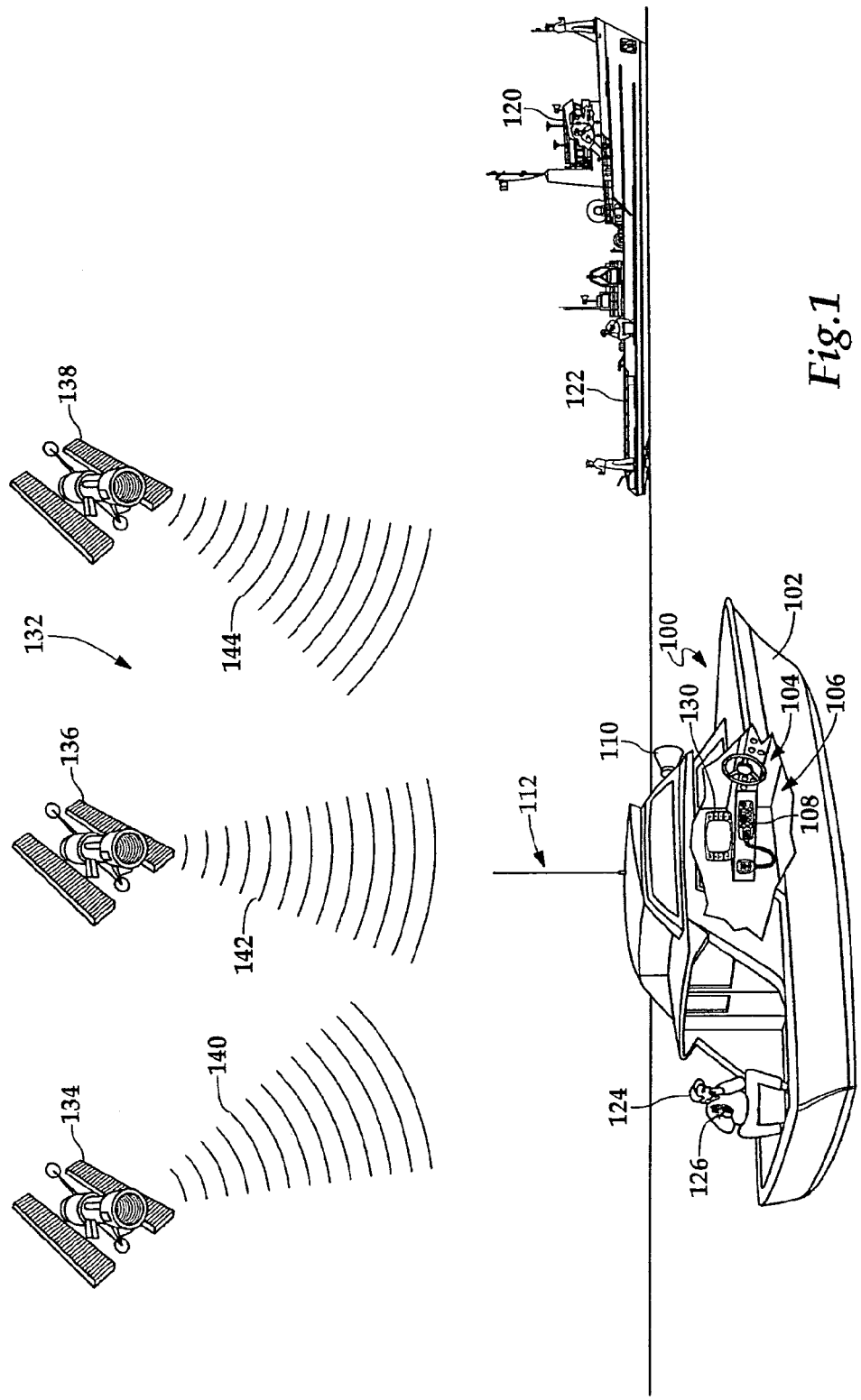
FIG. 1 is an view of a marine radio communication system incorporating global positioning capability disposed onboard a waterborne marine vessel according to certain embodiments of the present invention.

Referring initially to FIG. 1, a marine radio communication system 100 of the present invention is shown employed onboard a marine vessel 102. A shipboard radio station 104 positioned at the bridge 106 of marine vessel 102 is fitted with a fixed mount marine radio frequency transceiver, or "marine radio" 108. A loud speaker 110 and marine radio frequency antenna 112 are coupled to fixed mount marine radio 108 to provide audio and radio frequency marine communications, respectively.

A seaman 124 is holding a marine radio remote wireless handset 126 which wirelessly communicates with fixed mount marine radio 108, thereby enabling an operator to send and receive marine communications from any position on marine vessel 102. For example, as illustrated, seaman 124 is positioned towards the aft of the marine vessel 102 and away from the bridge 106 and fixed mount marine radio 108. Marine radio remote wireless handset 126, however, facilitates marine communication via wireless communication with fixed mount marine radio 108.

Preferably, fixed mount marine radio 108 is a very high frequency (VHF) frequency modulation (FM) transceiver that allows shipboard radio station 104 to communicate with shipboard radio stations such as shipboard radio station 120 onboard nearby marine vessel 122 and coastal radio stations (not shown) over medium range distances by generating and receiving frequency modulated electromagnetic (EM) signals at certain predetermined radio frequency channels, specifically marine radio frequency channels.

Marine vessel 102 and marine vessel 120 communicate with one another over a common marine radio frequency protocol. In order for radio frequency transceivers such as fixed mount marine radio 108 to communicate effectively with one another, they must communicate using a common set of frequencies. The overall protocol may be relatively simple or complex, depending on the application. At a minimum, the frequency or frequencies over which signals are to be carried must be known to both transceivers. If a first transceiver is, for example, transmitting a radio frequency signal at 161.8000 MHz, a second transceiver must be set to receive the 161.8000 MHz signal in order to effectively receive the communication from the first transceiver. Similarly, if the second transceiver is transmitting a radio frequency signal at 157.2000 MHz, the first transceiver must be set to receive the 157.2000 MHz signal.

In order to simplify and organize radio frequency communications, radio frequency bands are organized into specific communications channels. A "simplex" channel constitutes a specific frequency within the band separated from adjacent channels by a frequency gap sufficient to prevent sideband interference with the adjacent channels. A simplex channel is used to both transmit and receive signals. A "duplex" channel constitutes a pair of frequencies, which may or may not be adjacent to one another. One frequency is designated the "transmit" or "TX" frequency, with the other designated the "receive" or "RX" frequency.

In the context of marine radio frequency communications of the type employed by marine vessel 102 and marine vessel 120, communications occur between approximately 156 MHz and approximately 162 MHz. Within this 6 MHz band, adjacent marine radio channels are separated from one another by at least 25 KHz. This level of channel separation provides for over 200 discrete frequencies within the 6 MHz marine radio frequency band at which a marine radio frequency can be placed. In practice, only certain of these frequencies are designated channels for marine radio frequency communications.

The protocols for marine radio communication vary by jurisdiction. An international marine radio protocol applies to vehicles navigating international waters. For marine vessels navigating the waters of a nation, a different protocol may apply. Under applicable United States regulations, certain types of marine vessels navigating U.S. waters are required to have the on-board capability to communicate over certain of the available marine radio frequency channels. These vessels include power-driven vessels of 20 meters or more in length, vessels of 100 gross tons or more carrying passengers for hire, towing vessels of 26 feet or more in length while navigating and any dredge or floating plant engaged in or near channel or fairway in operations likely to restrict or affect navigation of other vessels. Such vessels must must at least be capable of transmitting and receiving at 157.100 MHz, which has been designated marine radio channel 22A. Marine vessels navigating certain U.S. waterways must also be capable of transmitting and receiving at 156.375 MHz, which has been designated marine radio channel 67. In certain circumstances, marine vessels are required to monitor 156.650 MHz, designated channel 13, and/or channel 67 (156.375 MHz).

Channels 13 and 67 are assigned to 156.650 MHz and 156.375 MHz not only according to the frequency list used in the United States, but also under the Canadian and international frequency lists. Further, each of these frequency lists provides for simplex (single-frequency) communication over these two channels. Accordingly, a marine radio set to channel 13 or channel 67 could readily communicate with other marine radios on the same channel in U.S., Canadian or international waters. Channel 9 (156.450 MHz) and channel 16 (156.800 MHz) are other examples of channels employing common use in all three jurisdictions.

While channels 9, 13, 16 and 67 are good examples of channels having common characteristics in a variety of areas, marine radio 22A is a good example of a channel which does not have a common usage. In the waters of the United States, channel 22A is a simplex channel employing the frequency 157.100 MHz for transmitting and receiving RF signals between marine radios. In Canadian waters, channel 22A has the same usage. The international frequency list does not provide for a channel 22A to be used in international waters. Instead, 157.100 MHz is employed as the transmit frequency for duplex channel 22. Accordingly, a marine vessel attempting to communicate over "channel 22A" in international waters would not be successful in carrying on two-way communication.

An even better example of a channel not shared between multiple frequency lists is international channel 4, which is a defined as a duplex channel receiving over 160.800 MHz and transmitting over 156.200 MHz. International channel 4 is not recognized in Canadian waters, although there is a Canadian channel 4A, which is a simplex channel transmitting and receiving over 156.200 MHz. Neither international channel 4 nor Canadian channel 4A is recognized in U.S. waters. Accordingly, a vessel in Canadian waters communicating on channel 4A will find its marine radio communications impaired as it moves out of Canadian waters.

Given that the boundaries of international and national waters are not always clearly delineated, and given the fact that the captain of a marine vessel is often kept busy with navigating the vessel, there is a significant risk that a marine radio in a vessel moving across and along international boundaries will be at certain times set to communicate over marine radio frequencies which are not recognized by the other marine vessels in its vicinity. In certain circumstances, this impaired communications ability could present substantial hazards to the vessel and the other vessels in the vicinity. Accordingly, marine radio 108 incorporates a set of features useful to maintain marine radio 108 in the proper operating mode as it moves between jurisdictions.

In order to accurately locate the position of marine vessel 102, fixed mount marine radio 108 is operably connected to a mobile global positioning system (GPS) receiver 130 operable to determine its position using signals received via GPS antenna 150 from the GPS system 132. The GPS system 132 incorporates a set of GPS satellites 134, 136, 138, each transmitting a GPS signal 140, 142, 144, respectively. Each of the GPS signals 140, 142, 144 may include a satellite identification code, satellite status data, the current date and time and the position of the GPS satellite 134, 136, 138 transmitting the GPS signal 140, 142, 144 and of other GPS satellites 134, 136, 138 in the GPS system 132.

As shown in FIG. 1, GPS receiver 130, disposed within marine vessel 102, acquires GPS signals 140, 142, 144 via GPS antenna 150. Using GPS signals 140, 142, 144, the GPS receiver 130 can calculate the location of marine vessel 102. As discussed above, GPS signals 140, 142, 144 from multiple GPS satellites 134, 136, 138 are required in order to calculate the position of the GPS receiver 130. In fact, the three GPS satellites 134–138 shown in FIG. 1 are considered the minimum number of GPS satellites necessary to determine the current position of GPS receiver 130. Additional GPS satellites (not shown) will facilitate a higher level of precision in locating the GPS receiver 130.

Using the information received from GPS receiver 130, marine radio 108 is operable to plot the position of marine vessel 102 against a map of jurisdictional boundaries. Using this information, marine radio 108 can then determine the jurisdiction within which marine vessel 102 is presently located, and determine the appropriate protocol to be employed for marine radio communications, as described further in connection with FIGS. 5–7, below.

Figure 2:
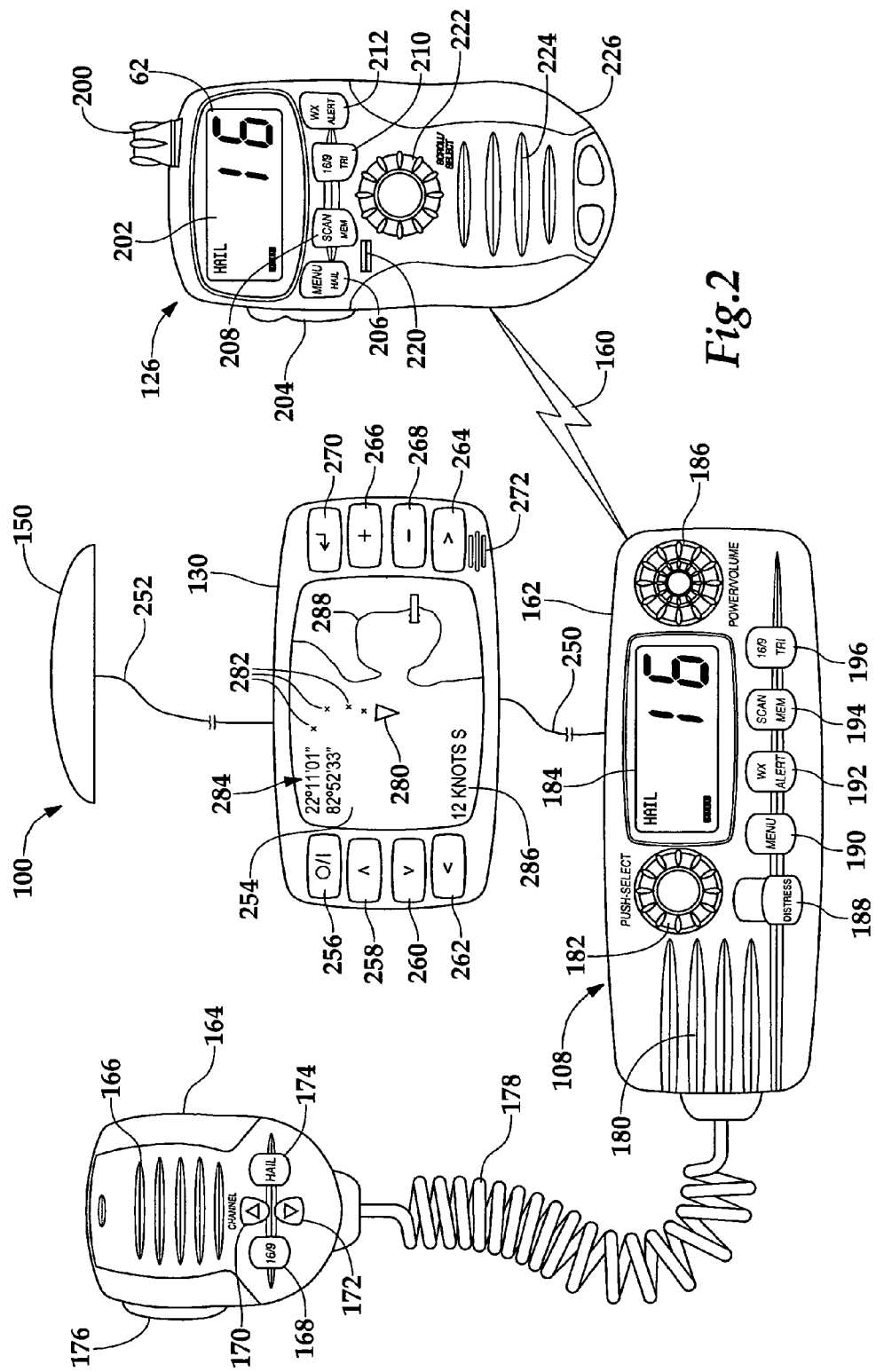
FIG. 2 is a front view of a marine radio communication system incorporating global positioning capability according to certain embodiments of the present invention.

Referring now to FIG. 2, marine radio communication system 100 is illustrated schematically. A first fixed mount marine radio 108 is in direct wireless communication with marine radio remote wireless handset 126 as represented by wireless communication link 160. In certain embodiments, the wireless communication may occur at 900 MHz, 2.4 Ghz or 5.8 GHz. It should be understood, however, that fixed mount marine radio 108 and marine radio remote wireless handset 126 may communicate at other frequencies depending on multiple considerations including technological limitations, manufacturing costs and government regulations.

Fixed mount marine radio 108 includes a fixed transceiver base 162 and a hand microphone 164. Fixed mount marine radio 108 is selectively operable to transmit marine radio frequency communications in a sending mode and receive marine radio frequency communications in a receiving mode. Hand microphone 164 connected to fixed mount marine radio 108 may include a microphone 166, function keys 168, 170, 172, 174 and push to talk actuator 170. Hand microphone 164 may receive acoustic inputs for marine radio frequency communication when fixed mount marine radio 108 is in the sending mode. Push to talk actuator 170 may selectively operate fixed mount marine radio 108 between the sending mode and the receiving mode. With this arrangement, when push to talk actuator 170 is depressed, acoustic input signals received by microphone 166 are transmitted by the attached fixed mount marine radio 108 over the currently selected marine radio frequency channel. As illustrated, the function keys may include 16/9 channel function key 168, channel selection keys 170, 172 and hailer key 174. The 16/9 channel key 168 tunes the fixed mount marine radio 108 to Channel 16 (156.8 MHz) with one click and to Channel 9 (156.45 MHz) with two clicks. Channel 16 is the international distress, safety and calling channel. Boaters use this channel to get the attention of another station in an emergency. Boats and ships required to carry a fixed mount marine radio 108 maintain a listening watch on this channel, as does the United States Coast Guard. Channel 9 is the boater calling channel established by the Federal Communications Commission (FCC) as a supplementary calling channel for noncommercial vessels and recreational boaters to ease the congestion of Channel 16. Accordingly, the ease of access that the 16/9 channel function key 168 provides to Channels 16 and 9 is very valuable on navigable waterways.

Channel selection keys 170, 172 provide easy channel selection with an up channel key 170 that switches to the next channel up and a down channel key 172 that switches to the next channel down. Hailer key 174 changes the mode of marine communication from wireless to auditory by switching the output of the attached fixed mount marine radio 108 from marine radio frequency antenna 112 to the attached loud speaker 110.

A wireline 178 connects hand microphone 164 to the fixed transceiver base 162 of fixed mount marine radio frequency transceiver 108. Fixed transceiver base 162 includes a speaker 180 that generates sound associated with marine communications when the fixed mount marine radio 108 is in its receiving mode. Push-select knob 182 facilitates navigation of software menus. Display 184 displays information about the function of fixed mount marine radio 108 such as the currently tuned channel. Power/volume control 186 controls transceiver power and audio output volume level.

As illustrated, the function keys associated with transceiver base 162 may include distress call key 188, menu key 190, weather (WX) alert key 192, scan memory key 194 and 16/9 TRI key 196. Distress call key 188 sends out a distress call in Digital Selective Calling (DSC). In general DSC is used to establish communications with ship or coast stations or to receive calls from other ships or coast stations. DSC works in conjunction with VHF, MF and HF radio systems and employs a two tone digital signal protocol to selectively call a particular station or to call a group of stations, all stations in a particular geographic area, or to call all stations.

Menu key 190 provides access to the software menus. The software menus provide features such as a programmable memory. WX alert key 192 changes the channel to the last used weather channel. Alternatively, the weather alert function may be equipped with Specific Area Message Encoding (SAME). Scan memory key 194 scans preprogrammed channels. The 16/9/TRI key 196 accesses Channel 16 and Channel 9 and provide a triple watch mode. It should be understood by those skilled in the art that although fixed mount marine radio 108 is illustrated and described above as having certain functions, other functions known in marine radio frequency communications are within the teachings of and do not depart from the present invention. For example, a fixed mount marine radio 108 is often equipped with a squelch control key in order to eliminate output noise when no marine communication or an extremely weak marine communication is received.

As depicted in FIG. 2, marine radio remote wireless handset 126 includes a channel selection knob 200. By turning channel selection knob 200 to the left or right, a channel may be selected. Marine radio remote wireless handset 126 relays the channel selection to the fixed mount marine radio 108 on a frequency, such as 900 Mhz, 2.4 Ghz or 5.8 Ghz. Fixed mount marine radio 108 then tunes in to the selected channel and relays marine communications to the marine radio remote wireless handset 126. Fixed mount marine radio 108 may tune into Coast Guard Channel 22A (157.1 MHz), the "piloting" Channel 13(156.65 MHz) or ship-to-ship safety Channel 6 (156.3 MHz), for example. It should be apparent to those skilled in the art that while fixed mount marine radio 108 sends and receives marine communications on a wide band of marine frequencies, such as VHF band, over medium range distances, marine radio remote wireless handset 126 sends and receives marine communications with fixed mount marine radio 108 via wireless communication link 160 at a different frequency band over relatively short range distances.

A display 202 is positioned on marine radio remote wireless handset 126 to provide a functionality similar to display 184 of fixed mount marine radio 108. A push to talk actuator 204 is positioned on the side of marine radio remote wireless handset 126. Similar to push to talk actuator 170, push to talk actuator 204 selectively operates fixed mount marine radio 108 and marine radio remote wireless handset 126 between the sending mode and the receiving mode. When push to talk actuator 204 is depressed, marine radio remote wireless handset 126 sends a signal to fixed mount marine radio 108 to switch fixed mount marine radio 108 to the sending mode. When push to talk actuator 204 is released, marine radio remote wireless handset 126 sends a signal to fixed mount marine radio 108 to switch fixed mount marine radio 108 to the receiving mode. It should be understood by those skilled in the art that although a particular system of control interrupts has been presented, alternative interrupt schemes are within the teachings of the present invention.

Function keys mounted on the marine radio remote wireless handset 126 include menu/hail key 206, scan memory key 208, 16/9 TRI key 210 and WX alert key 212. Function keys 206, 208, 210, 212 perform functions largely identical to function keys 168, 170, 172, 174 and 188, 190, 192, 194, 196 of fixed mount marine radio 108. As briefly described already and as will be described in more detail hereinbelow, when a function is selected on marine radio remote wireless handset 126, a command signal is sent to fixed mount marine radio 108 and reply signal is sent back to marine radio remote wireless handset 126 over wireless communication link 160. As described above, other functions known in marine communications may be employed with the marine radio remote wireless handset 126 of the present invention.

Microphone 220 receives sound for wireless communication when fixed mount marine radio 108 is in the sending mode. Scroll/select knob 222 provides a navigation tool for software menus on marine radio remote wireless handset 126. Speaker 224 generates sound associated with received wireless communications when fixed mount marine radio 108 is in the receiving mode. A waterproof casing 226 is positioned on the outside of the marine radio remote wireless handset 126 to provide protection from water. Optionally, marine radio remote wireless handset 126 may include a belt clip or other suitable carrying mechanism. It should be appreciated by those skilled in the art that although only one marine radio remote wireless handset 126 is presented communicating with fixed mount marine radio 108, more than one marine radio remote wireless handset 126 may be employed to communicate with fixed mount marine radio 108.

Fixed transceiver base 162 is operably connected to GPS receiver 130 through a GPS communication link 250. In various embodiments, GPS communication link 250 may represent a physical electrical connection, a wireless connection or an optical connection, as examples. GPS receiver 130 is, in turn, operably connected to GPS antenna 150 via GPS antenna link 252. Similarly to GPS communication link 250, GPS antenna link 252 may represent a physical electrical connection, a wireless connection or an optical connection, as examples. In certain embodiments, GPS antenna 150 may be disposed within the same physical enclosure as GPS receiver 130, while in other embodiments GPS receiver 130 and GPS antenna 150 may be disposed in separate enclosures. Similarly, in certain embodiments fixed transceiver base 162 and GPS receiver 130 may be disposed in a common enclosure.

GPS receiver 130 may have a number of components, some of which are depicted in FIG. 2. GPS receiver 130 may incorporate, for example, a display 254 for presentation of maps and menus, a power key 256 for powering GPS receiver 130 up and down, a set of navigation keys 258–264, zoom in and zoom out keys 266 and 268, an accept key 270 and a speaker 272 for audio output. In various embodiments, fewer or more components may be included. In certain embodiments, GPS receiver 130 may incorporate mapping capability and may include an internal memory for storage of geographical and waypoint data. In certain embodiments, GPS receiver 130 may be operable to receive updates to stored map data through external sources.

As shown in FIG. 2, display 254 may communicate a variety of data, including a current position and orientation icon 280, waypoints 282, current latitude and longitude data 284 and current velocity data 286. Display 254 may also communicate geographical data, including a graphical depiction of a shoreline 288. Although this capability and more may be included in GPS receiver 130, the data generated by GPS receiver 130 having primary importance for the purposes of the present invention includes current position data and/or current velocity data. So long as GPS receiver 130 is capable of determining either current position and/or current velocity, it is sufficiently functional to be employed in the context of the current invention.

Figure 3:
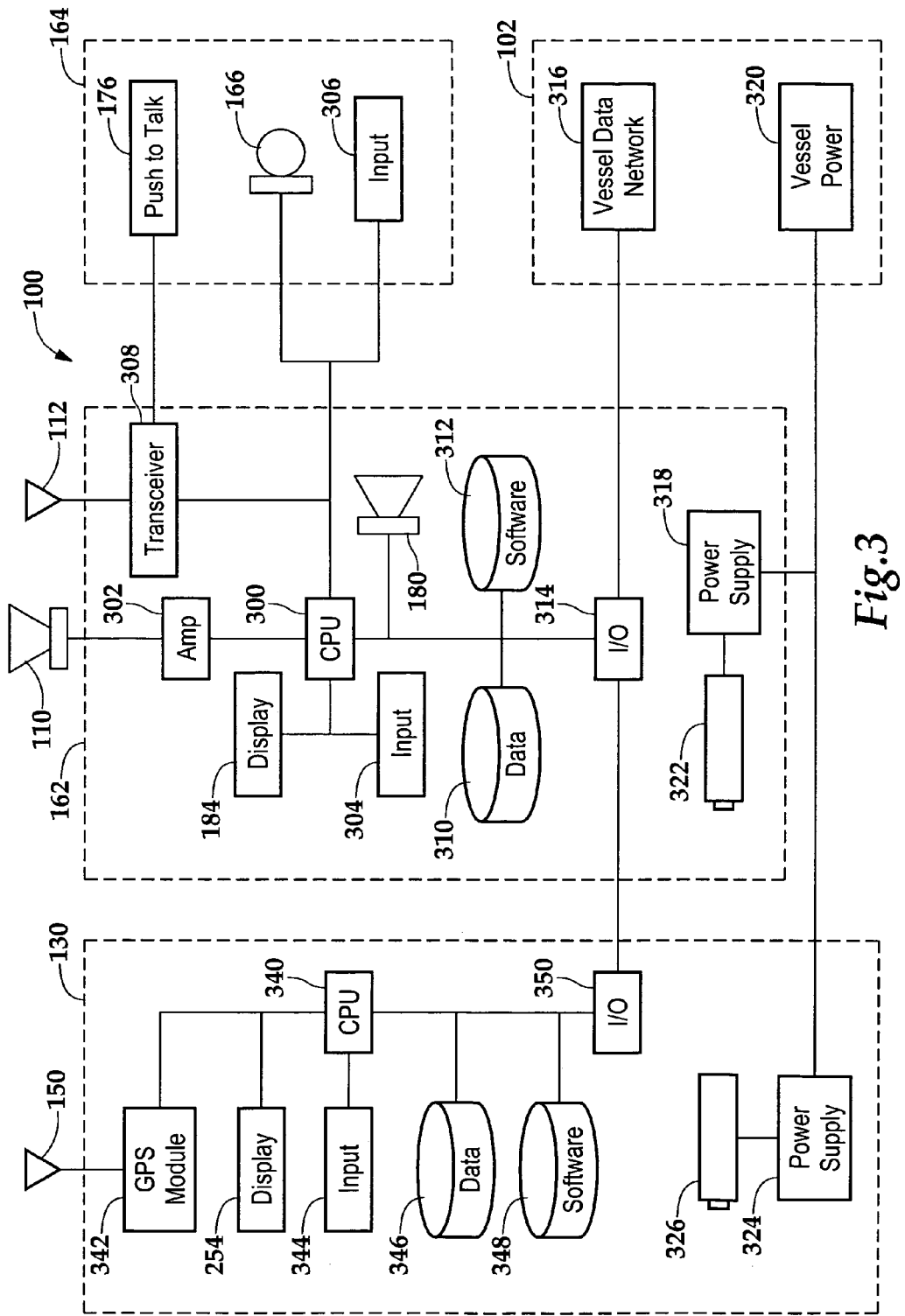
FIG. 3 is a schematic block diagram of a marine radio communication system incorporating global positioning capability according to a first embodiment.

Turning to FIG. 3, depicted therein is a schematic block diagram showing fixed transceiver base 162, GPS receiver 130 and components of marine vessel 102. A microprocessor 300 controls the operations of fixed mount marine radio 108. Loud speaker 110 is electrically coupled to the microprocessor 300 via amplifier 302 and positioned outside fixed transceiver base 162 as depicted by the placement outside the dashed lines. When fixed mount marine radio 108 is in the sending mode and the hailer function is activated, microprocessor 300 routes the marine communication through the loud speaker 110 for local auditory marine communications. Microphone 166 and speaker 180 are electrically coupled to microprocessor 300. Microphone 166 receives sound for marine communication when the fixed mount marine radio 108 is in the sending mode. Speaker 180 generates sound associated with received marine communications when the fixed mount marine radio 108 is in the receiving mode.

Display 184 is electrically coupled to microprocessor 300 to provide visual output for data such as the status of the hailer function and the current channel, for example. Inputs 304 and 306 are coupled to microprocessor 300. Inputs block 304 represents transceiver base functions such as power/volume control 186 and 16/9 TRI key 196, as examples. Similarly, inputs block 306 represents hand microphone inputs 168–174. Transceiver 308 is electrically coupled to microprocessor 300 to convert marine radio frequency signals received via antenna 112 into electrical signals for processing by microprocessor 300 and to convert electrical signals into marine radio frequency signals for transmission via antenna 112. An additional transceiver (not shown) sends and receives radio frequency signals to and from marine radio remote wireless handset 126 via wireless link 160.

Push to talk actuator 170 operates transceiver 308 and fixed mount marine radio 108 between sending and receiving modes. Antenna 112 radiates radio frequency signals toward remote stations, such as remote ship stations or coast stations, and receives radio frequency waves from remote stations. Data memory module 310 and software memory module 312 store the data necessary for the operation of fixed mount marine radio 108. An input/output module 314 controls communications between fixed mount marine radio 108, vessel data network 316 and GPS receiver 130. Power supply 318 regulates electrical power within fixed mount marine radio 108, by receiving power from vessel power grid 320 and regulating power within marine radio battery 322.

Although fixed mount marine radio 108 is illustrated with a particular configuration, fixed mount marine radio 108 may have a different configuration. For example, transceiver 308 and antenna 112 may be separate units connected to the fixed mount marine radio 108 via an input port (not shown). Moreover, antenna 112 may represent an antenna array rather than a discrete antenna. Additionally, fixed mount marine radio 108 may employ any power source such as a DC connection to a ship generator or batteries.

GPS receiver 130 is controlled by GPS CPU 340, which is operably connected to the principal functional components of GPS receiver 130, including GPS module 342, display 254, inputs 344, storage database 346, software database 348 and input/output module 350. GPS module 342 determines the global position of GPS receiver 130, and therefore marine vessel 102, based on signals received via GPS antenna 150 and provides this information to GPS CPU 340 and the other functional components of GPS receiver 130. Based upon the current position information, GPS CPU 340 may direct display 254 to display location information based on geographic data stored in database 346 according to programming instructions stored in software database 348. Although databases 346, 348 are shown as single databases, it will be appreciated by those of skill in the art that either or both of databases 346, 348 may represent multiple separate databases, such as a first database stored on an internal hard drive, a second database stored on a CD-ROM, DVD-ROM or flash memory card and a third database accessed via a wireless internet connection, as an example.

Input/output module 350 communicates with input/output module 314 of fixed transceiver base 162. In the embodiment shown in FIG. 3, input/output module 350 is operably connected to vessel data network 316 in order to share data with other components of marine vessel 316. Power to marine radio 108 and GPS receiver 130 is provided by vessel power 320 through marine radio power supply 318 and GPS receiver power supply 324 when available. Power to marine radio 108 and GPS receiver 130 is provided by marine radio battery 322 and GPS receiver battery 326 respectively whenever vessel power 320 is for some reason unavailable or off-line.

Figure 4:
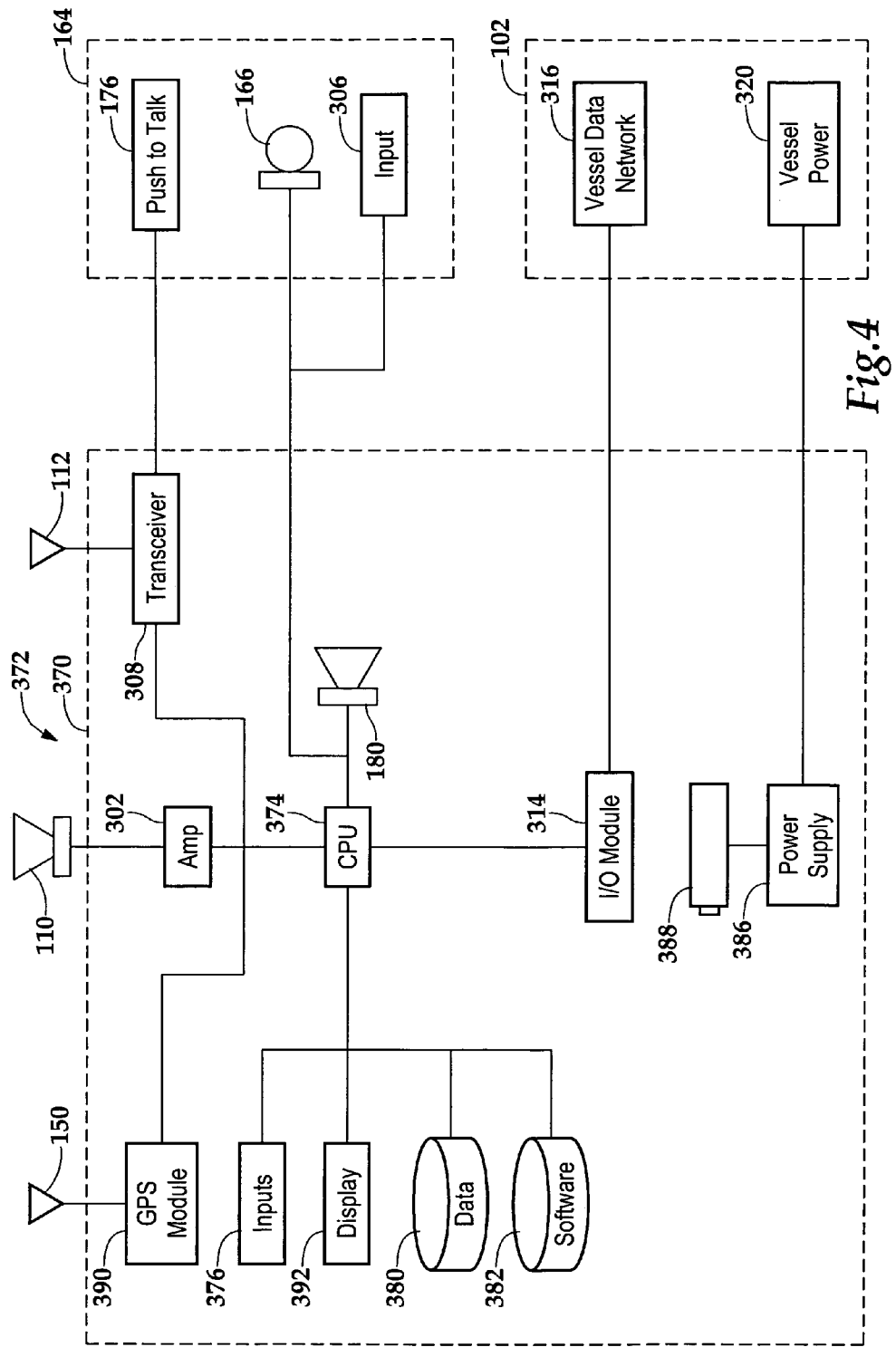
FIG. 4 is a schematic block diagram of a marine radio communication system incorporating global positioning capability according to a second embodiment.

Turning to FIG. 4, depicted therein is a schematic block diagram showing a second embodiment of the present invention in which the GPS receiver 130 is incorporated within a fixed GPS-enabled transceiver base 370 of a fixed mount marine radio 372. Microprocessor 374 controls the operations of fixed mount marine radio 372, including GPS decoding operations. As such, microprocessor 374 represents the combined functionality of marine radio microprocessor 300 and GPS receiver microprocessor 340 shown and described in FIG. 3. Those of skill in the art will appreciate that microprocessor 374 may, in a particular embodiment, represent two or more separate components.

Loud speaker 110 is electrically coupled to the microprocessor 374 via amplifier 302 and positioned outside fixed GPS-enabled transceiver base 370 as depicted by the placement outside the dashed lines. When fixed mount marine radio 372 is in the sending mode and the hailer function is activated, microprocessor 374 routes the marine communication through the loud speaker 110 for local auditory marine communications. Microphone 166 and speaker 180 are electrically coupled to microprocessor 374. Microphone 166 receives sound for marine communication when fixed mount marine radio 372 is in the sending mode. Speaker 180 generates sound associated with received marine communications when the fixed mount marine radio 372 is in the receiving mode.

Display 392 is electrically coupled to microprocessor 374 to provide visual output for data such as the status of the hailer function and the current channel, for example. Inputs, represented by inputs blocks 376, 306 are coupled to microprocessor 374. Inputs block 376 may represent transceiver base and GPS receiver functions such as power/volume control 186, 16/9 TRI key 196, and navigation keys 258–264, as examples. Similarly, inputs block 306 represents hand microphone inputs 168–174. Transceiver 308 is electrically coupled to microprocessor 374 to convert marine radio frequency signals received via antenna 112 into electrical signals for processing by microprocessor 374 and to convert electrical signals into marine radio frequency signals for transmission via antenna 112. An additional transceiver (not shown) sends and receives radio frequency signals to and from a marine radio remote wireless handset 126 via a wireless link (not shown).

In a similar manner to that described above in connection with FIG. 3, push to talk actuator 170 operates transceiver 308 and fixed mount marine radio 372 between sending and receiving modes. Antenna 112 radiates radio frequency signals toward remote stations, such as remote ship stations or coast stations, and receives radio frequency waves from remote stations. Data memory module 380 and software memory module 382 store the data necessary for the operation of fixed mount marine radio 372. Memory modules 380, 382 represent the combined functionality of marine radio memory modules 310, 312 and GPS receiver memory modules 346, 348. Input/output module 384 controls communications between fixed mount marine radio 372 and vessel data network 316. Power supply 386 regulates electrical power within fixed mount marine radio 372 by receiving power from vessel power grid 320 and regulating power within marine radio battery 388. As noted above in connection with fixed mount marine radio 108, although fixed mount marine radio 372 is illustrated with a particular configuration, fixed mount marine radio 372 may have a different configuration.

GPS functionality within fixed mount marine radio 372 is provided by GPS module 390, which is operably connected to microprocessor 374. GPS module 390 determines the global position of fixed mount marine radio 372, and therefore marine vessel 102, based on signals received via GPS antenna 150 and provides this information to microprocessor 374 and the other functional components of fixed mount marine radio 372. Based upon the current position information, microprocessor 374 may direct display 392 to display location information based on geographic data stored in memory module 380 according to programming instructions stored in software memory module 382. Although databases 380, 382 are shown as single databases, it will be appreciated by those of skill in the art that either or both of databases 380, 382 may represent multiple separate databases, such as a first database stored on an internal hard drive, a second database stored on a CD-ROM, DVD-ROM or flash memory card and a third database accessed via a wireless internet connection, as an example.

Figure 5:
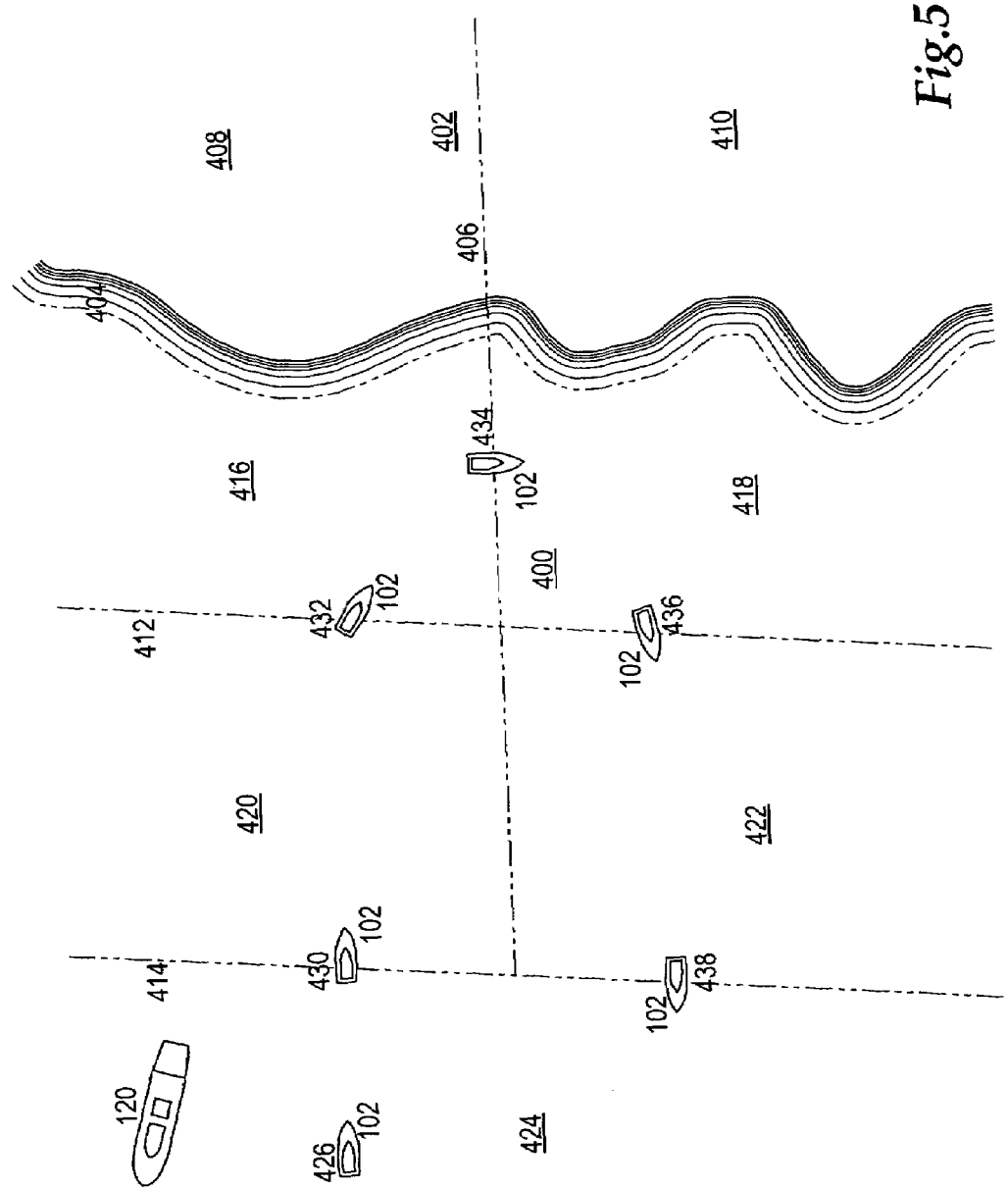
FIG. 5 depicts a map of a shoreline between a body of water and a land mass showing a course of a marine vessel according to the present invention.

The apparatus and methods of the present invention may be employed in a variety of environments. As an example of an environment in which the present invention may be employed, FIG. 5 depicts a map of a shoreline 404 between a body of water 400 and a land mass 402. Land mass 402 is separated by a political boundary 406 into a first political territory 408 and a second political territory 410. Political territories 408, 410 may, for example, be separate nations, but may be political subdivisions of a smaller scope, such as provinces or states. For the purposes of the present invention, it is important only that political territory 408 and political territory 410 employ marine radio communications protocols differing in some respect.

International boundaries 412, 414 represent the boundaries between the territorial waters 416, 418, 420, 422 of political territory 408, 410 and international waters 424. International waters 424 are considered to begin at international boundary 412 for certain marine navigation purposes, while international waters 424 are considered to begin at international boundary 414 for other marine navigation purposes. As an example, the standard definition of territorial waters includes all waters within 12 nautical miles of the coastline. This boundary may be represented by boundary 412 or boundary 414.

Marine vessel 102 is shown at a first position 426 well outside of boundary 414 defining the outer edge of the territorial waters 420 of political territory 408. Marine vessel 102 is engaged in marine radio communication with marine vessel 120 as it moves toward shoreline 404. At a later point in time, marine vessel 102 arrives at position 430 on boundary 414 defining the outer edge of territorial waters 420 and the inner edge of international waters 424. At this later point in time, marine vessel 102 is still in marine radio communication with marine vessel 120, which remains in international waters 424.

It is assumed, for the purposes of the present discussion, that the proper operating mode for marine radio 108 varies between international waters 424 and territorial waters 420. As an example, the international frequency list and the frequency list for territorial waters 420 may differ in some respect. In such a case, the frequency list for marine radio 108 must be changed as marine vessel 102 crosses boundary 414 from international waters 422 to territorial waters 420, in order to facilitate marine radio communication between marine vessel 102 and other marine vessels (not shown) in territorial waters 420. In certain cases, other aspects of the operating mode of marine radio 108 may need to be changed in addition to the frequency list.

According to certain aspects of the present invention, marine radio 108 incorporates the functionality to acquire the position of marine vessel 102 through GPS receiver 130 and to compare that position to a map of territorial boundaries such as boundaries 406, 412, 414. Using this information, marine radio 108 can determine the appropriate operating mode to be used at the current position. Although the marine radio 108 could set the operating mode automatically using this information, certain embodiments of the present invention query the user prior to a change in the frequency list, for reasons described below.

As noted above, at point 430 marine vessel 102 and marine vessel 120 are communicating on a marine radio channel. It is assumed for the purposes of the present discussion that the channel on which marine vessel 102 and marine vessel 120 are communicating as marine vessel 102 crosses into territorial waters 420 exists on the international frequency list but not on the frequency list for territorial waters 420. Accordingly, despite the fact that marine vessel 102 is moving from international waters 424 to territorial waters 420, and a change in the operating mode is required, marine vessel 102 may need to continue to use the international frequency list for at least enough time to coordinate a channel change with marine vessel 120.

If the frequency list for marine radio 108 were to change without warning to the user, communication between marine vessel 102 and marine vessel 120 would be interrupted without advance notice to either vessel. Under certain conditions, this interruption in communication could give rise to a hazardous situation. For this reason, certain embodiments of the present invention will not change the frequency list for marine radio 108 until the user has been alerted to the change and has confirmed that the operating mode is to be changed.

As seen in FIG. 5, marine vessel 102 continues past point 430, through territorial waters 420 over to point 432 on boundary 412. Owing to the fact that territorial waters 420 and territorial waters 416 are the territorial waters of the same political territory 408, the frequency list for both waters 416, 420 is likely to be the same. In certain areas, however, the marine navigation and communications regulations may vary somewhat as a vessel moves between different portions of the territorial waters of a political territory. In certain situations, such regulations may affect the manner of operation of the marine radio 108. For example, regulations may exist requiring certain vessels to monitor certain marine radio channels in defined areas of the territorial waters. In order to accommodate such regulations, marine radio 108 may incorporate the ability to adjust its operating mode to conform to the regulations. Depending on the application, marine radio 108 may or may not require user confirmation for such a change.

Marine vessel 102 continues past point 432, through territorial waters 416 over to point 434 on territorial boundary 406. Using GPS data, marine radio 108 will acquire the position of marine vessel 102, compare it to the aforementioned map, and determine that marine vessel 102 is moving from the territorial waters 416 of political territory 408 to the territorial waters 418 of political territory 410. Assuming that there is a difference between the frequency list used in the territorial waters 416 of political territory 408 and the frequency list used in the territorial waters 418 of political territory 410, marine radio 108 will alert the user to the change in jurisdiction and query the user as to a change in the operating mode.

In the same manner as described above, marine vessel 102 continues past points 434, 436, 438 through territorial waters 418, 422 and back into international waters 424. At each point 436, 438, marine radio 108 will determine, using GPS data, that there is a change in the region within which marine vessel 102 is operating, and will change the operating mode of marine radio 108, if necessary. Where significant changes in the operating mode are required, marine radio 108 may require user confirmation to change its operating mode. Where minor changes are required, marine radio 108 may change its operating mode automatically.

In certain embodiments, the marine radio 108 may apply a certain level of hysteresis to the conditions giving rise to a change in operating mode. Such hysteresis could be time-related or distance-related, or a combination of both. In other words, the marine radio 108 would not indicate a change in operating mode immediately upon crossing into a new operating zone, but would delay the change until the marine vessel 102 was past the zone boundary by some certain distance or had been on one side of the zone boundary continuously for some certain period of time.

Figure 6:
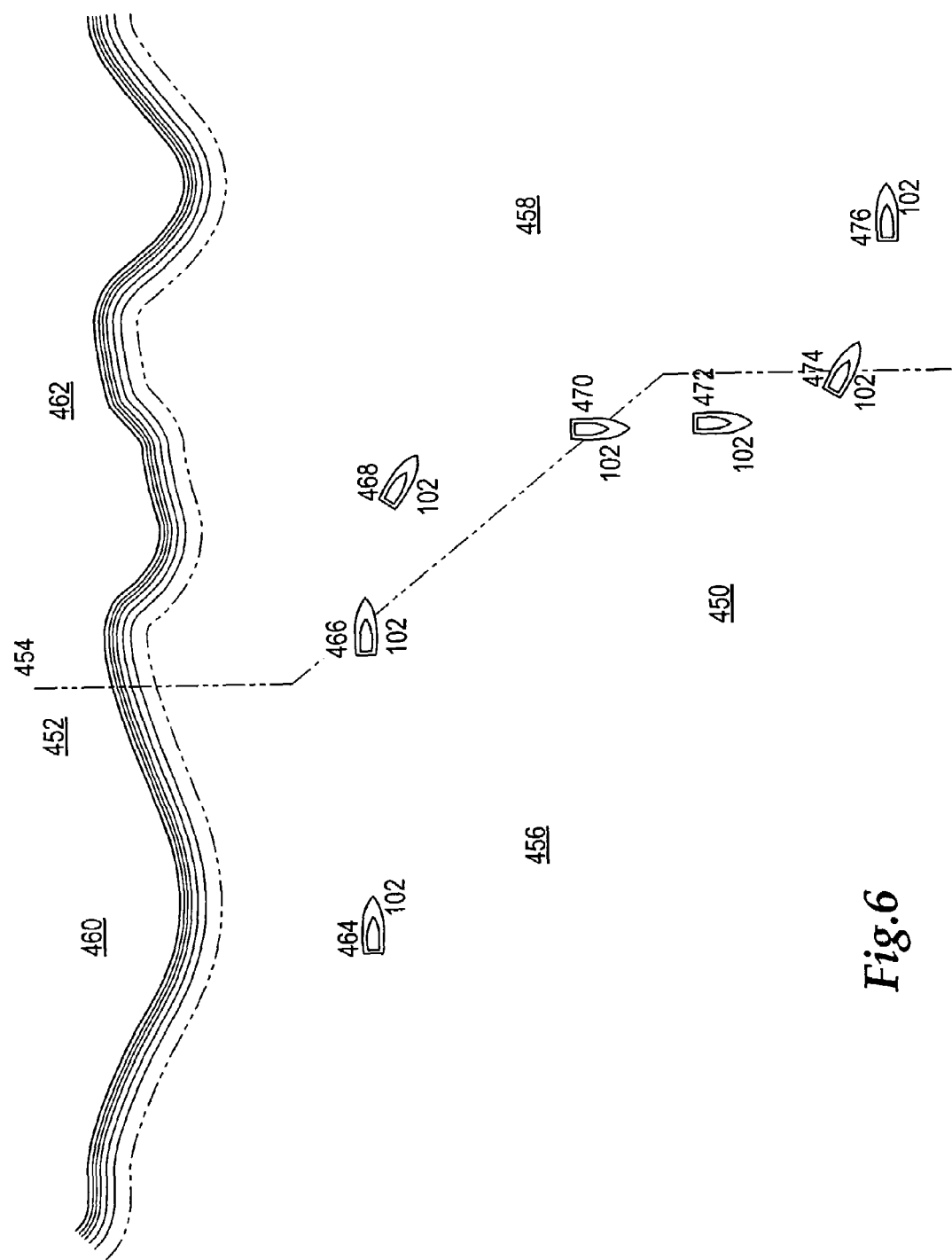
FIG. 6 depicts a map of a shoreline between a body of water and a land mass showing a course of a marine vessel according to the present invention.

A hysteresis mechanism may be of particular value when the marine vessel 102 spends a significant amount of time near a boundary delineating a change in operating mode. Even if the marine vessel 102 is not intermittently crossing the boundary, error inherent to the GPS system could, under certain circumstances, place the calculated location of marine vessel 102 on alternate sides of the boundary on successive readings. If there is no hysteresis or inertia built in to the system, the marine radio 108 may attempt to change its operating mode much more often than is necessary for optimal usage. Such behavior may, in fact, tend to interfere with rather than facilitate effective marine radio communication. A second implementation of the present invention is shown in FIG. 6. A body of water 450 is adjacent to a land mass 452. A time zone boundary 454 divides water 450 into region 456 in a first time zone and region 458 in a second time zone. Similarly, time zone boundary 454 divides land mass 452 into a first region 460 in the first time zone and a second region 462 in the second time zone.

Marine vessel 102 is shown at point 464 well within first time zone region 456. Marine vessel 102 travels in the direction of time zone boundary 454 until it intersects time zone boundary 454 at point 466. As described above, marine radio 108 is operable to receive GPS data from GPS receiver 130. In certain embodiments, marine radio 108 may incorporate time zone boundaries such as time zone boundary 454 into the maps stored in its memory. In such an embodiment, marine radio 108 will determine that marine vessel 102 is crossing time zone boundary 454, and may thereby determine that a change in operating mode is necessary. A straightforward example of such a change in operating mode would be a change in the time setting of a clock within marine radio 108, although other changes to the operating mode may also be made. In certain embodiments, the user may be queried prior to any change in the operating mode. In other embodiments, the change may be made automatically. In certain embodiments, the marine radio 108 may apply a certain level of hysteresis to the change. Such hysteresis could be time-related or distance-related, or a combination of both.

Marine vessel 102 continues past point 466 into second time zone region 458, through point 468 and down to point 470, where marine vessel 102 again crosses time zone boundary 454. Using GPS data, marine radio 108 will determine that marine vessel 454 has intersected time zone boundary 454. The manner of response of marine radio 108 will depend on the particular embodiment. In embodiments employing hysteresis, marine radio 108 may delay making any operating mode changes or alerting the user until marine vessel 102 travels a certain distance past time zone boundary 454 or remains within first time zone region 456 for a certain period of time, or both. In certain embodiments, marine radio 108 may not change the clock setting until the user has confirmed that the change should be made.

Marine vessel 102 moves from point 470 at time zone boundary 454, to point 472 within first time zone region 456, to point 474 at time zone boundary 454 and finally to point 476 within second time zone region 458. The manner in which marine radio 108 responds to these transitions between first time zone region 456 and second time zone region 458 will vary according to the particular embodiment, as described above.

The value of incorporating a certain level of hysteresis can be seen with respect to points 470, 472, 474. If marine vessel 102 is traveling in a certain general direction from one time zone to another, it may not be desirable that every temporary transition from one time zone to another forces an immediate change in the clock setting within marine radio 108. A certain level of confusion may be avoided by the incorporation of a certain level of hysteresis.

Figure 7:
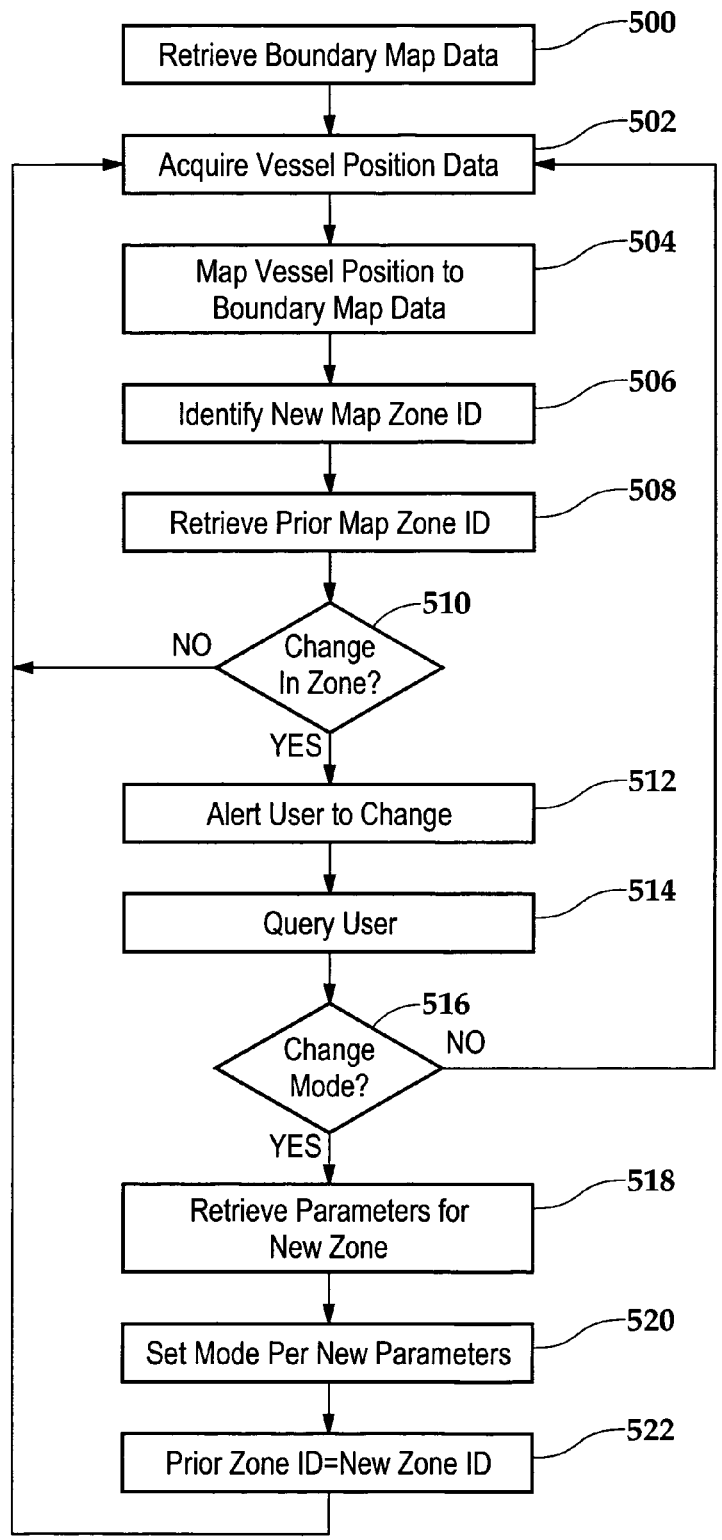
FIG. 7 is a flowchart depicting a method of selecting a communications mode according to certain embodiments of the present invention.

FIG. 7 depicts a flow chart presenting a method of operation of a marine radio according to certain embodiments of the present invention. Process flow begins in block 500, wherein the marine radio retrieves the boundary map data delineating the boundaries between the various zones within which marine radio 108 may employ varying operating modes. In block 502, the marine radio 108 acquires vessel position data from the GPS receiver 130. In block 504, the vessel position data acquired in block 502 is mapped against the boundary map data retrieved in block 500. The map zone within which vessel 102 currently operates is identified in block 506. The map zone within which marine vessel 102 was operating as of the last mapping operation is retrieved in block 508.

In decision block 510, the marine radio 108 compares the identity of the current map zone to the identity of the prior map zone to determine if the marine vessel 102 has moved into a new map zone. In certain embodiments, this comparison may include a hysteresis mechanism so that the marine vessel 102 may not be considered to have moved into a new map zone until it has traversed a specified distance into the new map zone or remained in the new map zone longer than a specified period of time, or both. If the marine radio 108 determines that there has not been a change in zone (however defined), process flow returns to block 502, wherein the marine radio 108 acquires a new set of vessel position data. If the marine radio 108 determines that there has been a change in zone, process flow proceeds to block 512.

In block 512, the user is alerted to the change in operating zone. As discussed above, this step may be omitted under certain situations wherein the change in operating mode does not present a foreseeable safety risk and there is not a particular need that the user know of the change in operating mode.

In block 514, the user is queried as to whether or not the change in operating mode is to be made. Process flow from decision block 516 depends on the user's selection. If the user does not authorize the change in operating mode, process flow returns to block 502, wherein a new set of vessel position data is acquired. In certain embodiments, the user's choice as to whether the operating mode is to be changed may be retained until the marine vessel 102 enters a new zone. In other embodiments, the marine radio 108 may periodically query the user as to whether the operating mode is to be changed. In the embodiment shown in FIG. 7, the identity of the prior map zone is retained and not replaced if the user elects to not change the operating mode. Accordingly, the marine radio 108 would continue to alert and query the user until the user accepted the change or the vessel 102 returned to the prior map zone. In certain embodiments, the user may be given the option to either delay the change in operating mode or completely disregard the change in zone.

In the event that the user authorizes the change in operating mode in decision block 516, process flow proceeds to block 518, wherein the marine radio 108 retrieves the operating parameters specified for the new zone. The operating parameters of the marine radio 108 are set to conform to these parameters in block 520, and the identity of the new zone is stored as the "prior" zone id in block 522. Process flow then returns to block 502, wherein a new set of vessel position data is acquired.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A marine vessel having a marine radio disposed thereon and operable to set the operating mode of the marine radio based upon the location of the marine vessel comprising;
    a first processor component operable to determine the location of the marine vessel based upon signal inputs;
    a database containing a set of at least two operating modes; and
    a second processor component operable to select an operating mode from the set of at least two operating modes based on the location of the marine vessel.

2. The marine vessel as recited in claim 1 wherein the signal inputs are global positioning signal inputs.

3. The marine vessel as recited in claim 1 wherein the first processor component is a portion of a global positioning system receiver.

4. The marine vessel as recited in claim 1 wherein the second processor component is a portion of a fixed mount marine radio.

5. The marine vessel as recited in claim 1 wherein the operating mode determines the set of frequencies over which the marine radio communicates.

6. The marine vessel as recited in claim 1 wherein the operating mode determines the local time setting for the marine radio.

7. The marine vessel as recited in claim 1 wherein the operating mode is selected from the group consisting of simplex operating mode and duplex operating mode.

8. An apparatus for setting the operating mode for a marine radio onboard a marine vessel at a location comprising:
    a processor operable to determine the location of the marine vessel;
    a means for selecting an operating mode from a set of at least two operating modes based on operating mode selection criteria comprising the location of the marine vessel; and
    a means for setting the operating mode of the marine radio to the selected operating mode.

9. The apparatus as recited in claim 8 wherein the location of the marine vessel is determined using global positioning signals.

10. The apparatus as recited in claim 8 wherein the processor is a portion of a global positioning system receiver.

11. The apparatus as recited in claim 8 wherein the apparatus is disposed within the marine radio.

12. The apparatus as recited in claim 8 wherein the operating mode determines a local time setting within the marine radio.

13. The apparatus as recited in claim 8 wherein the operating mode determines the set of frequencies over which the marine radio communicates.

14. The apparatus as recited in claim 8 wherein the operating mode is selected from the group consisting of simplex communication mode and duplex communication mode.

15. A method of selecting an operating mode for a marine radio having a location comprising the steps of:
    determining the location of the marine radio;
    selecting an operating mode from a set of at least two operating modes based on operating mode selection criteria comprising the location of the marine radio; and
    setting the operating mode of the marine radio to the selected operating mode.

16. The method as recited in claim 15 wherein the location of the marine radio is determined using global positioning signals.

17. The method as recited in claim 15 wherein the operating mode determines a local time setting within the marine radio.

18. The method as recited in claim 15 wherein the operating mode determines the set of frequencies over which the marine radio communicates.

19. The method as recited in claim 15 wherein the operating mode determines a set of communications modes for a set of marine radio frequency communications channels, each selected from the group consisting of simplex mode and duplex mode.

20. The method as recited in claim 15 wherein the operating mode determines a communications mode and a set of one or more frequencies for each of a set of marine radio frequency communications channels.

* * * * *